United States Patent [19]
Trieb

[11] Patent Number: 5,791,454
[45] Date of Patent: Aug. 11, 1998

[54] CONVEYOR SYSTEM FOR TRANSPORTING GOODS

[75] Inventor: Herbert Trieb, Wolfurt, Austria

[73] Assignee: Konrad Doppelmayr & Sohn Maschinenfabrik Gesellschaft mbH & Co. KG, Wolfurt, Austria

[21] Appl. No.: 657,298

[22] Filed: Jun. 3, 1996

[30] Foreign Application Priority Data

Jun. 1, 1995 [AT] Austria ................. 929/95

[51] Int. Cl.[6] ............................... B65G 15/44
[52] U.S. Cl. ................ 198/699; 198/821; 198/838
[58] Field of Search ............... 198/845, 779, 198/838, 821, 699, 698, 690.2

[56] References Cited

U.S. PATENT DOCUMENTS

| | | | |
|---|---|---|---|
| 768,682 | 8/1904 | Parker | 198/838 |
| 4,674,627 | 6/1987 | Benlcio, I | 198/821 |
| 4,676,367 | 6/1987 | Nolte | 198/821 |

*Primary Examiner*—Joseph E. Valenza
*Assistant Examiner*—Khoi H. Tran
*Attorney, Agent, or Firm*—Laurence A. Greenberg; Herbert L. Lerner; Werner H. Stemer

[57] ABSTRACT

A conveyor system for transporting goods has an endless conveyor belt and two support tracks, disposed one above the other, for supporting the conveyor belt. The conveyor belt is formed with a plurality of transverse beams which are spaced apart from one another in a conveying direction of the conveyor belt. Carrying rollers are supported on the transverse beams. The support are formed with carrying cables on which the rollers are supported. The weight of the conveyor belt is transmitted onto the carrying cables.

7 Claims, 5 Drawing Sheets

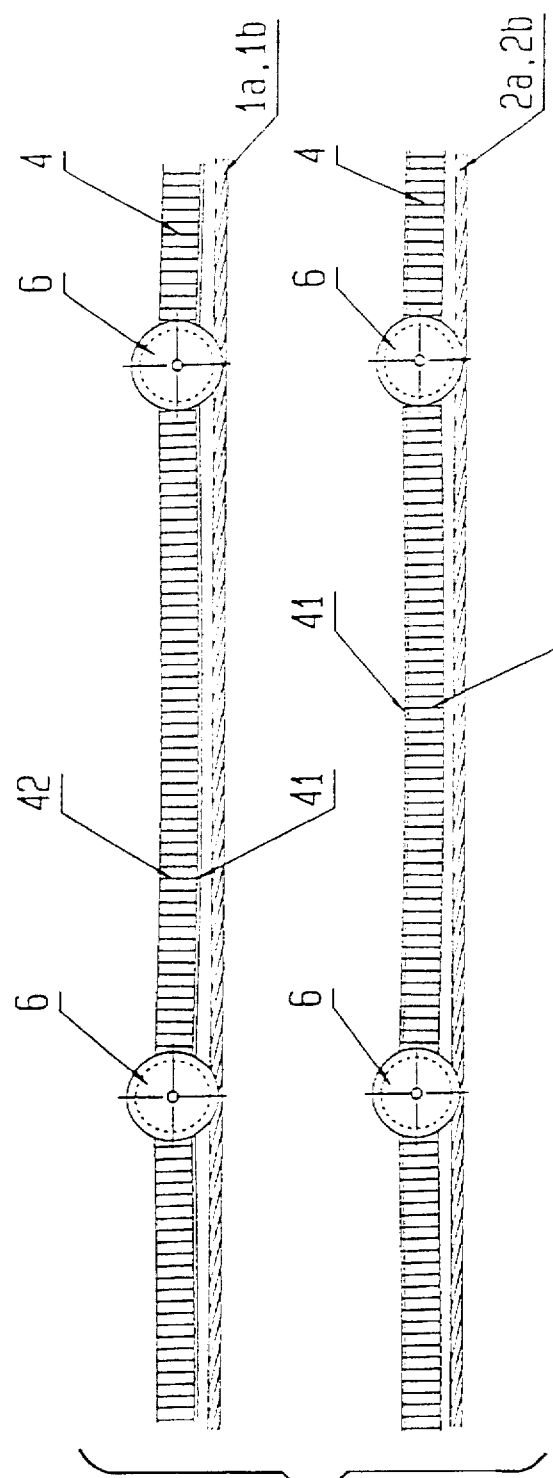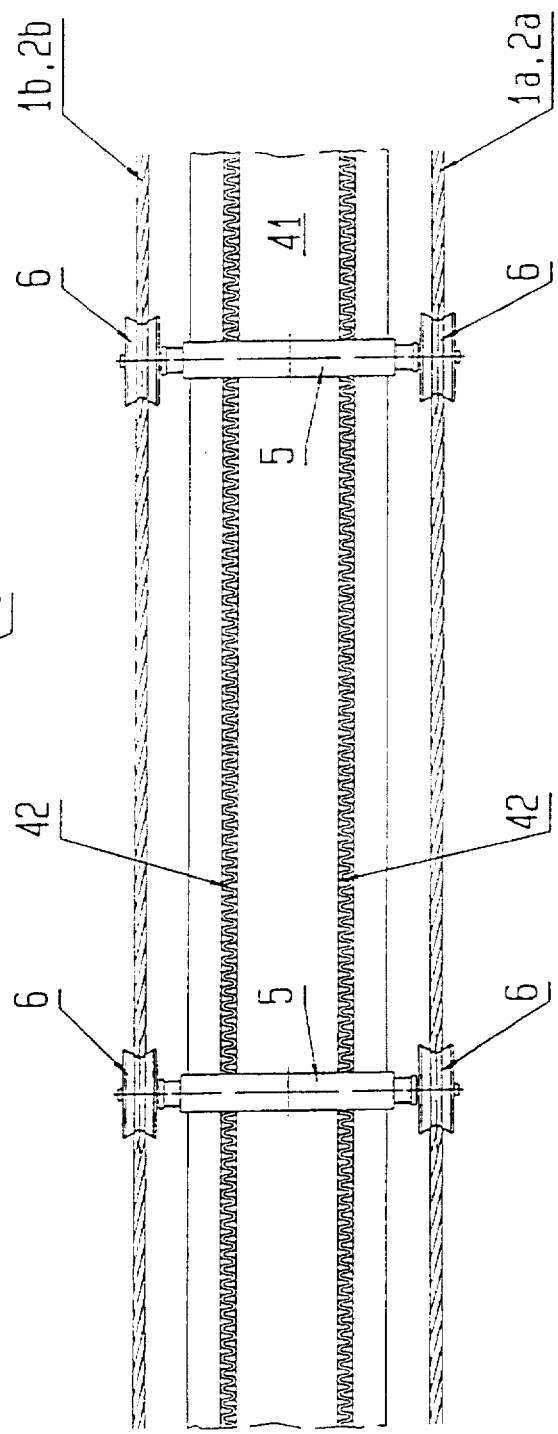

5,791,454

CONVEYOR SYSTEM FOR TRANSPORTING GOODS

BACKGROUND OF THE INVENTION

1. Field of the Invention

The invention relates to a conveyor system for transporting goods by means of a conveyor belt or the like, with two spaced-apart support tracks and with an endless conveyor belt which is embodied with beams or the like spaced apart from one another in the conveying direction; rollers are provided on lateral ends of the beams along the support tracks.

Prior art conveyor systems of that kind comprise an endless conveyor belt, guided over deflection rollers at both ends, and carrying rollers, on which the conveyor belt comes to rest. The carrying rollers are disposed below the upper run of the conveyor belt. The conveyor belt must have sufficient tensile strength to withstand the tensile forces dictated by the conveying motion on the one hand and the tensile forces exerted on it, on the other hand, by the weight of the goods being conveyed. The tensile strains on the conveyor belt caused by the weight of the goods being conveyed are reduced, when the spacing between the carrying rollers located below the upper run of the conveyor belt is reduced.

Moreover, the carrying rollers of those prior art systems roll relative to the conveyor belt and the conveyor belt slides over the carrying rollers. This causes extraneous tensile strain on the conveyor belt, and wear on the conveyor belt.

In such prior art conveyor systems, there is accordingly a need either to provide a conveyor belt with very high tensile strength, in which case the carrying rollers can be spaced farther apart from one another and a reduced number of conveying rollers can be provided over the full length of the conveying apparatus, or to provide a large number of carrying rollers which are spaced more closely. In the latter case, the tensile strains on the conveyor belt caused by the weight of the goods being conveyed are reduced. The conveyor belt may thus be embodied with lower tensile strength. However, a large number of carrying rollers must be provided, which raises the structural expense.

2. Summary of the Invention

It is accordingly an object of the invention to provide a conveyor system for transporting goods, which overcomes the above-mentioned disadvantages of the heretofore-known devices and methods of this general type and which utilizes conveyor belts with relatively low tensile strength, without the need closely spaced support rollers or other support devices which entail major structural expense.

With the foregoing and other objects in view there is provided, in accordance with the invention, a conveyor system for transporting goods, comprising:

an endless conveyor belt for transporting goods along a conveying direction; the conveyor belt being formed with a plurality of transverse beams spaced apart from one another in the conveying direction, carrying rollers supported on the transverse beams; and two support tracks, disposed one above the other, for supporting the conveyor belt; the support tracks being formed with carrying cables supporting the rollers and carrying the weight of the conveyor belt.

In other words, the objects of the invention are satisfied with two support tracks located one above the other, in the form of (pairs of) carrying cables, on which the conveyor belt rollers are supported such that the the weight of the conveyor belt is transferred onto the carrying cables.

In accordance with an added feature of the invention, the transverse beams have an underside, the conveyor belt being secured to the underside of the beams, the beams dividing the conveyor belt into individual segments.

In accordance with an additional feature of the invention, the conveyor belt is a corrugated edge conveyor belt having a support face and having corrugated edges, the support face of the conveyor belt being secured to the undersides of the carrying beams, segments of the corrugated edges being disposed between the beams and having ends secured to the forward and rear faces of the beams (as seen in the conveying direction). In the embodiment as a corrugated-edge conveyor belt, the belt can be deflected around the deflection rollers at the end points of the system.

In a particularly advantageous embodiment, a height of the beams and a height of the corrugated edges are approximately equal.

In accordance with a further feature of the invention, the transverse beams carry the rollers at the lateral end faces thereof.

In accordance with a concomitant feature of the invention, there are provided guide rails at the terminal ends of the conveyor belt, the guide rails guiding an upper pair of the carrying cables outwardly, laterally away from the conveyor belt, and a dead-end drum on which the upper pair and a lower pair of the carrying cables are wrapped.

As a result of this kind of conveyor system, only rolling of the rollers relative to the support tracks occurs, and as a result the tensile strain of the conveyor belt is reduced. The belt, therefore, may be embodied with substantially reduced tensile strength. Since moreover the conveyor belt does not slide over carrying rollers, it does not undergo any abrasion. Another advantage is that the rollers, which require maintenance or are subject to abrasion, periodically reach the end stations of the conveyor system, and as a result stationary maintenance or stationary replacement can be performed. Hence there is no need to carry out maintenance work or perform replacement of components over the length of the conveyor system.

Other features which are considered as characteristic for the invention are set forth in the appended claims.

Although the invention is illustrated and described herein as embodied in a conveyor system for transporting goods, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWING

FIG. 5a is a partial side elevational view of the conveyor system outside a support pillar; and FIG. 5b is a plan view thereof.

DESCRIPTION OF THE PREFERRED EMBODIMENTS

Figures 1, 2:
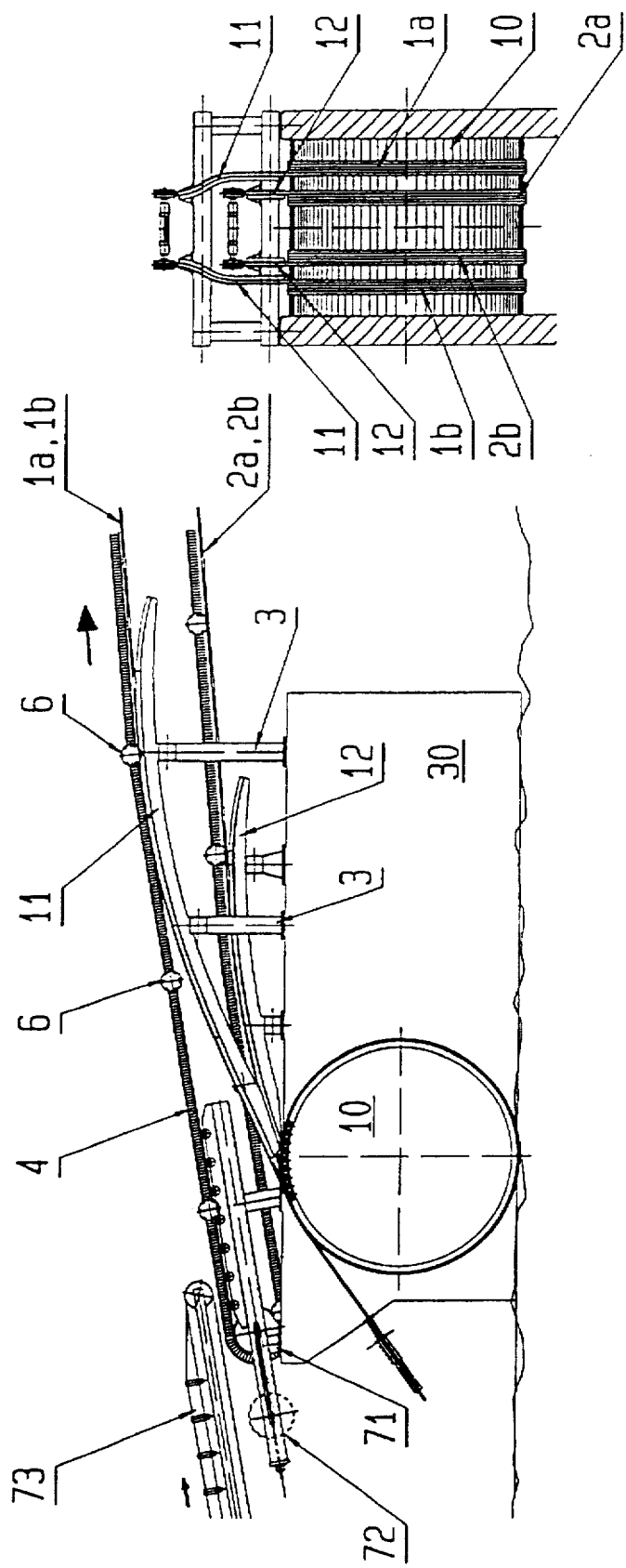
FIG. 1 is a partial side elevational view of one end of a conveyor system.
FIG. 2 is an elevational view a detail of the conveyor system, viewed in the conveying direction.

Referring now to the figures of the drawing in detail and first, particularly, to FIG. 1 thereof, there is seen a conveyor system according to the invention with two pairs of carrying cables 1 (1a, 1b) and 2 (2a, 2b), located at different heights, which extend over the entire length of the conveyor system. The cables 1a, 1b and 2a, 2b are carried, similarly to a carrying cable of a cable car system, by pillars 3 and they are firmly anchored to the ground or to a base or the like at the ends of the conveyor system.

The two pairs of carrying cables 1 and 2 are associated with a endless conveyor belt 4, which is guided over deflection rollers 71 at the ends of the conveyor system. At least one of the deflection rollers 71 is driven. A tension device 72 is provided for the conveyor belt 4. A feed device 73, by way of which the goods to be conveyed are placed on the conveyor belt 4, is illustrated at the beginning of the conveyor system.

The conveyor belt 4 is embodied with lateral rollers 6, which run onto and leave the carrying cables 1a, 1b and 2a, 2b at the ends of the conveyor system. The rollers 6 run on and are supported by the carrying cables 1 and 2 the entire extent of the conveyor system, except for the ends. As a result, the strain presented by the weight of the goods being conveyed is absorbed by the carrying cables 1 and 2, so that the conveyor belt 4 is relieved accordingly. The only motion is a roll-off motion.

At the ends of the conveyor system, the conveying cables 1 and 2 are placed in guide rails 11 and 12, wound multiple times around a dead-end drum 10, and anchored in a base 30. Since in this region of the conveyor system the path of motion of the conveyor belt 4 intersects the guide rails 11, the guide rails 11 are extended laterally to the outside, as can be seen from FIG. 2.

Figure 3A:
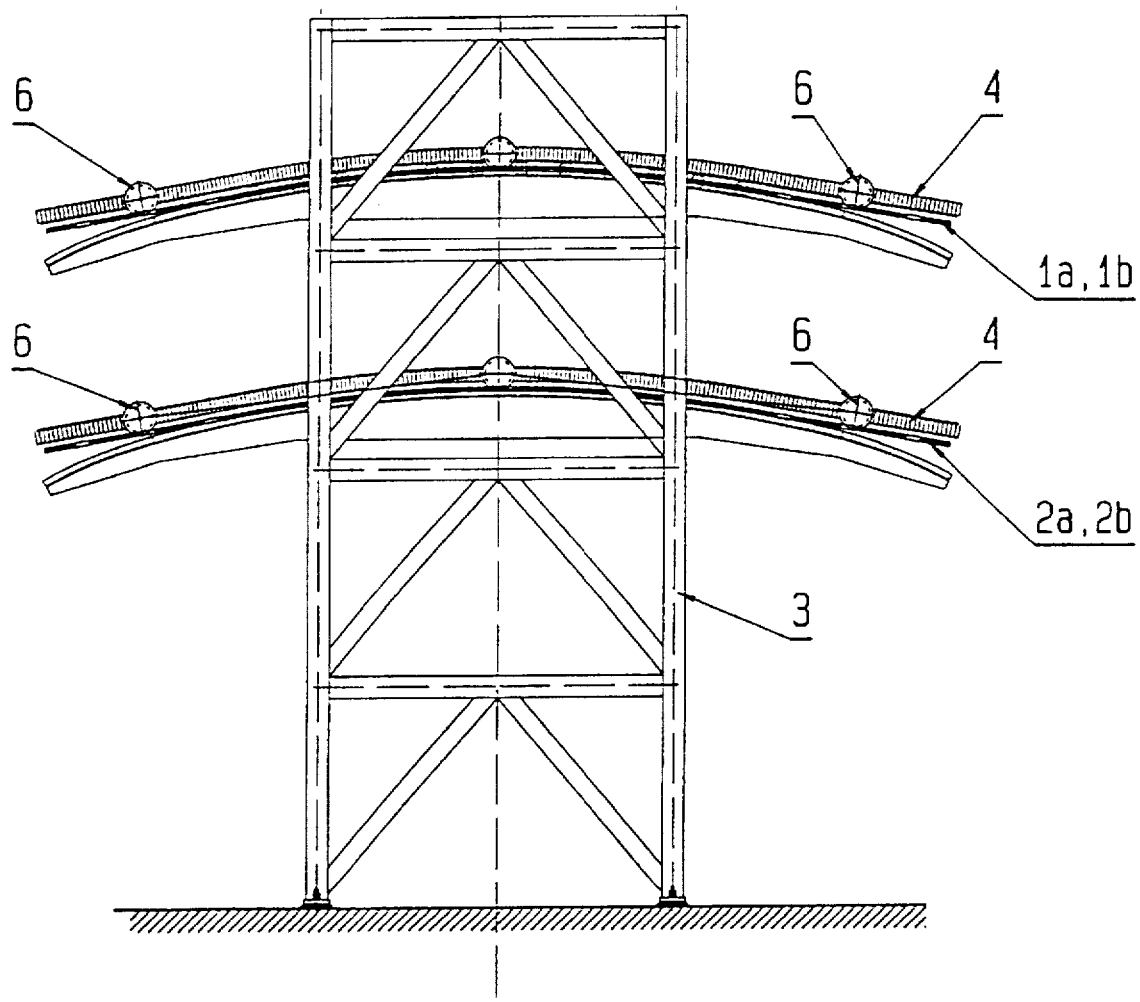
FIG. 3a is a side elevational view of a support pillar.
Figure 3B:
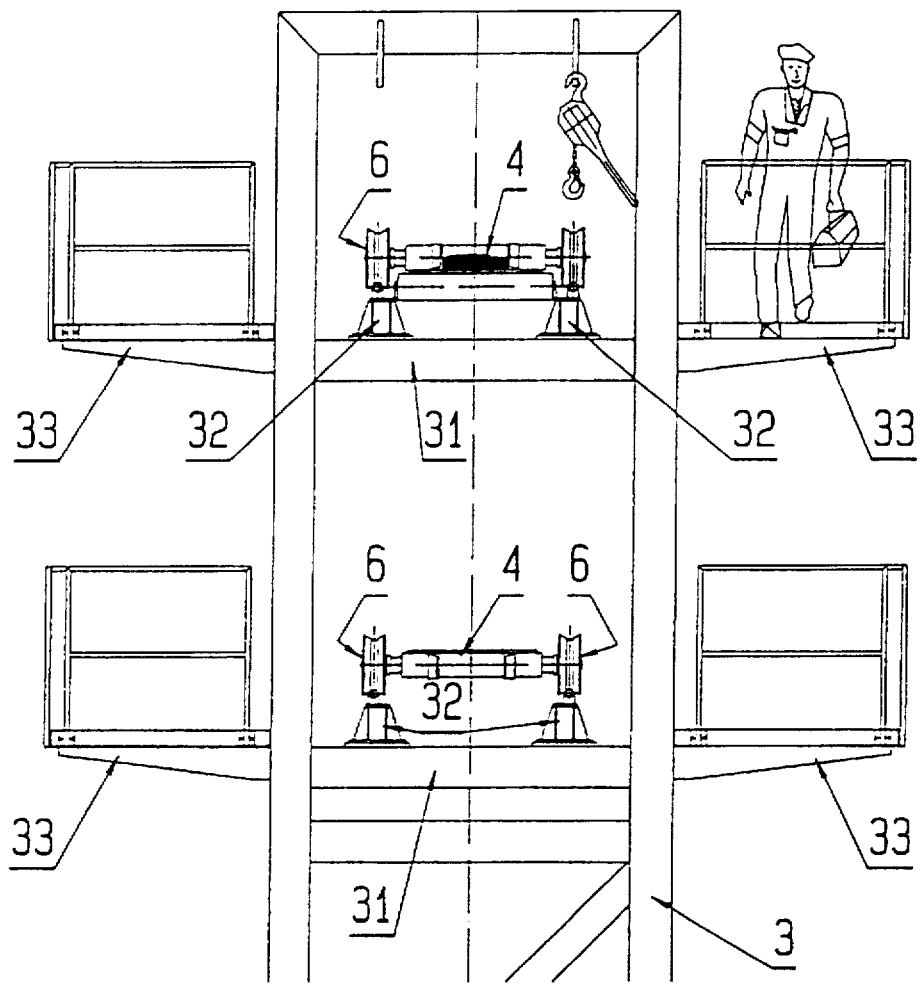
FIG. 3b is an elevational view thereof, viewed in the conveying direction.

FIGS. 3a and 3b show a support pillar 3 in more detail. With reference to FIG. 3b, the support pillars 3 have two transverse struts 31 at different heights. Bearing blocks 32 that support the carrying cables 1 and 2 from below are disposed on the struts 31. Platforms 33 that can be used for assembly and maintenance work can also be provided on the support pillars 3.

Figure 4:
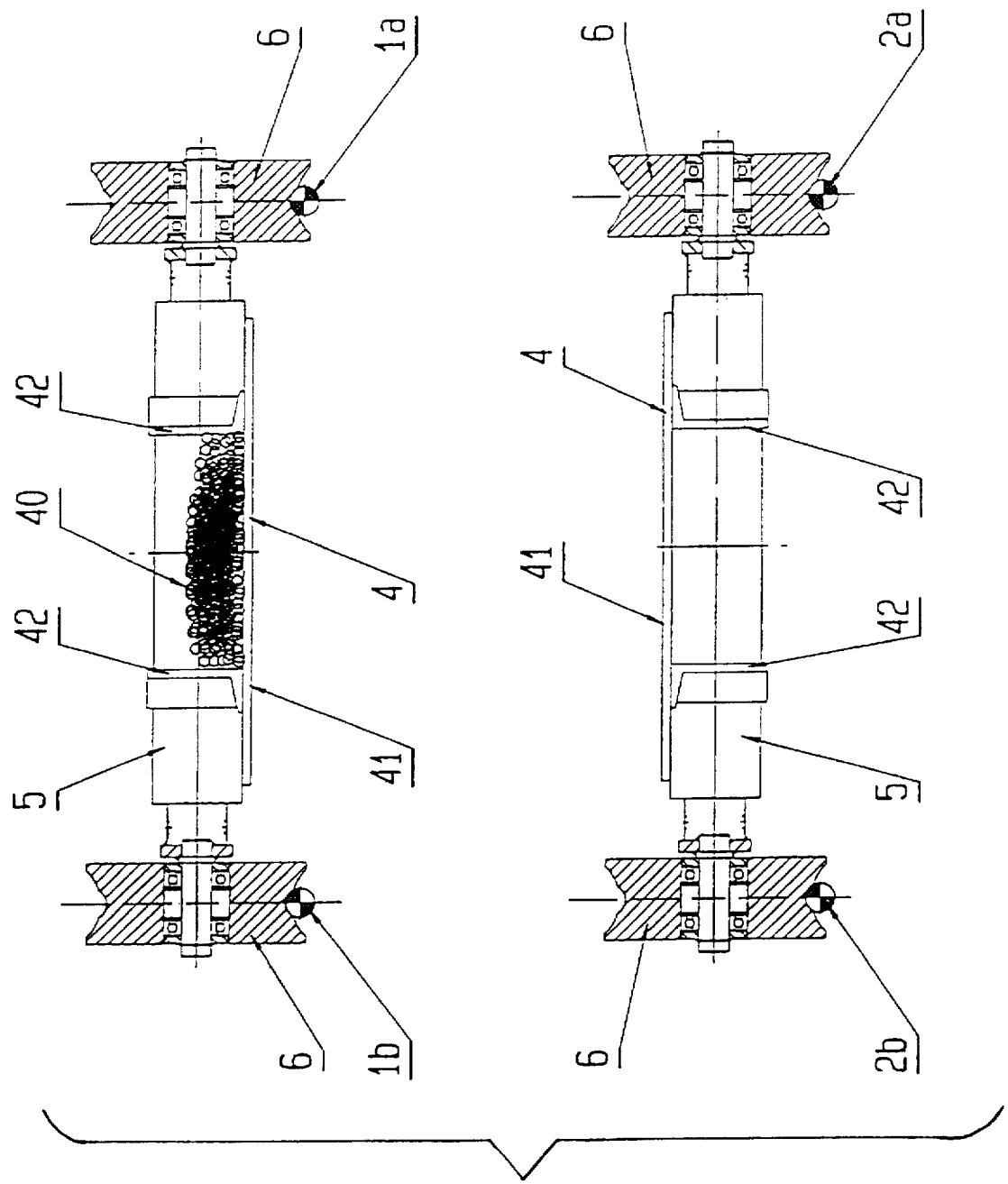
FIG. 4 is a vertical section through the conveyor system, outside of a support pillar.

FIGS. 4, 5a and 5b illustrate the conveyor belt 4 and the carrying rollers 6 in more detail. Spaced-apart beams 5 are provided over the course of the conveyor belt 4. The bottom face 41 of the conveyor belt 4 is secured to the underside of the beams 5. Corrugated edges 42 (or fan walls or the like) of the conveyor belt 4, extending laterally of the conveyor belt 4, are secured to the side faces of the beams 5. The corrugated edges 42 together with the beams define individual conveyor segments. The rollers 6, which roll off along the carrying cables 1a, 1b and 2a, 2b, are supported on the free ends of the beams 5. The goods 40 to be conveyed are located on the conveyor belt 4. Because of the corrugated edges 42, the conveyor belt 4 can be passed over the deflection rollers 71 at its ends.

The lion share of the strain exerted on the conveyor belt 4 by the goods 40 is transferred to the carrying cables 1 and 2. Accordingly, only the tensile force required for its own motion needs to be absorbed by the conveyor belt 4. Moreover, the conveyor belt is embodied with carrying rollers 6, which are movable along the cables 1a and 1b, and as a result the strains caused by the goods being conveyed need not be absorbed by the conveyor belt. As a result, conveyor systems of very great length can be manufactured.

I claim:

1. A conveyor system for transporting goods, comprising:
    an endless conveyor belt having an outer support surface for transporting goods along a conveying direction;
    a plurality of transverse beams spaced apart from one another in the conveying direction, said beams are attached to said outer support surface and carry rollers attached to said transverse beams;
    two support tracks, disposed one above the other, for supporting said endless conveyor belt;
    wherein said conveyor belt is a corrugated edge conveyor belt having corrugated edges.

2. The system according to claim 1, wherein said transverse beams have an underside, said conveyor belt being secured to the underside of said beams, said beams dividing said conveyor belt into individual segments.

3. The system according to claim 1, wherein said beams have side faces and said support face of said conveyor belt is secured to undersides of said carrying beams, segments of said corrugated edges of said belt being disposed between said beams and having ends secured to said side faces of said beams.

4. The system according to claim 3, wherein a height of said beams and a height of said corrugated edges are approximately equal.

5. The system according to claim 1, wherein said transverse beams each have lateral ends, and said rollers are supported on the lateral ends of said beams.

6. The system according to claim 1, wherein said conveyor belt extends between two terminal ends thereof, and including guide rails disposed at said terminal ends, said guide rails guiding an upper pair of said carrying cables outwardly, laterally away from said conveyor belt, and a dead-end drum on which said upper pair and a lower pair of said carrying cables are wrapped.

7. The system according to claim 1, wherein said support tracks are formed with carrying cables supporting said rollers and carrying a weight of said conveyor belt.

* * * * *